US011593561B2

(12) United States Patent
Contreras et al.

(10) Patent No.: US 11,593,561 B2
(45) Date of Patent: Feb. 28, 2023

(54) CONTEXTUAL SPAN FRAMEWORK

(71) Applicant: International Business Machines Corporation, Armonk, NY (US)

(72) Inventors: David Contreras, Willow Spring, NC (US); Krishna Mahajan, Raleigh, NC (US); Roberto Delima, Apex, NC (US); Kandhan Sekar, Durham, NC (US); Corville O. Allen, Morrisville, NC (US); Chris Mwarabu, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 16/567,186

(22) Filed: Sep. 11, 2019

(65) Prior Publication Data

US 2020/0175116 A1 Jun. 4, 2020

Related U.S. Application Data

(60) Provisional application No. 62/773,027, filed on Nov. 29, 2018.

(51) Int. Cl.
*G06F 40/30* (2020.01)
*G06K 9/62* (2022.01)
*G06F 16/31* (2019.01)
*G06F 40/205* (2020.01)

(52) U.S. Cl.
CPC ............ *G06F 40/30* (2020.01); *G06F 16/322* (2019.01); *G06F 40/205* (2020.01); *G06K 9/6231* (2013.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 4,641,264 A * | 2/1987 | Nitta | G06F 40/53 |
| | | | 704/4 |
| 5,418,717 A | 5/1995 | Su | |
| 5,715,468 A * | 2/1998 | Budzinski | G06F 16/3334 |
| | | | 707/E17.084 |
| 6,236,959 B1 | 5/2001 | Weise | |
| 6,965,857 B1 * | 11/2005 | Decary | G06F 40/205 |
| | | | 704/10 |
| 7,493,253 B1 | 2/2009 | Ceusters | |
| 9,269,353 B1 | 2/2016 | Rehani | |
| 9,390,087 B1 * | 7/2016 | Roux | G06F 40/56 |

(Continued)

OTHER PUBLICATIONS

Packard et al., Simple Negation Scope Resolution through Deep Parsing: A Semantic Solution to a Semantic Problem, 52nd annual ACL, 2014, pp. 69-78 (herein referred to as pp. 1-10). (Year: 2014).*

(Continued)

*Primary Examiner* — Lamont M Spooner
(74) *Attorney, Agent, or Firm* — Brian D. Welle

(57) ABSTRACT

A phrase that includes a trigger word that modifies a meaning within the phrase is received. The trigger word is identified. The words of the phrase that are modified by the trigger word are identified by analyzing features of the phrase that link the trigger word to other words. The phrase is interpreted by modifying the second subset of words according to the modification of the trigger word.

13 Claims, 6 Drawing Sheets

(56) References Cited

U.S. PATENT DOCUMENTS

| | | | |
|---|---|---|---|
| 9,678,949 B2* | 6/2017 | Monk, II | G06F 40/30 |
| 2002/0142277 A1* | 10/2002 | Burstein | G09B 7/02 434/335 |
| 2007/0174039 A1* | 7/2007 | Lin | G06F 40/205 704/1 |
| 2009/0048823 A1* | 2/2009 | Liu | G06F 40/279 704/9 |
| 2010/0242028 A1* | 9/2010 | Weigert | G06F 21/105 717/131 |
| 2012/0166180 A1* | 6/2012 | Au | G06F 40/237 704/9 |
| 2015/0278726 A1* | 10/2015 | Marx | G16H 40/20 705/2 |
| 2015/0309992 A1* | 10/2015 | Visel | G06F 40/30 704/9 |
| 2016/0098387 A1 | 4/2016 | Bruno | |
| 2016/0098394 A1* | 4/2016 | Bruno | G06F 40/30 704/9 |
| 2016/0350277 A1* | 12/2016 | Malle | G06F 40/211 |
| 2016/0357731 A1* | 12/2016 | Zorzin | G06F 40/232 |
| 2017/0039183 A1* | 2/2017 | Bai | G06F 16/313 |
| 2017/0178528 A1* | 6/2017 | Mayfield | G06F 40/253 |
| 2017/0286835 A1* | 10/2017 | Ho | G06N 3/08 |
| 2018/0075011 A1* | 3/2018 | Allen | G16H 50/20 |
| 2018/0096103 A1 | 4/2018 | Allen | |
| 2018/0101598 A1* | 4/2018 | Allen | G06F 40/268 |
| 2019/0005027 A1* | 1/2019 | He | G06N 20/00 |
| 2019/0228073 A1* | 7/2019 | Chatterjee | G06F 40/268 |
| 2020/0004813 A1* | 1/2020 | Galitsky | G06F 16/9538 |
| 2020/0250381 A1* | 8/2020 | Guo | G06F 40/289 |

OTHER PUBLICATIONS

Harkema et al., ConText: An algorithm for determining negation, experiencer, and temporal status from clinical reports, 2009, Journal of Biomedical Informatics 42, pp. 839-851. (Year: 2009).*

Diaz et al., Detecting negated and uncertain information in biomedical and review texts, 2013, Proceedings of the Student Research Workshop associated with RANLP 2013, pp. 45-50. (Year: 2013).*

Zhu et al., An Empirical Study on the Effect of Negation Words on Sentiment, 52nd Annual ACL, 2014, pp. 304-313 (Year: 2014).*

Title={Effective Bio-Event Extraction Using Trigger Words and Syntactic Dependencies}, author={Kilicoglu, Halil and Bergler, Sabine}, journal={Computational Intelligence}, vol. {27}, No. {4}, pp. {583-609}, 2011, publisher={Wiley Online Library}, (Year: 2011).*

Title={Evaluating Sentiment Analysis Methods and Identifying Scope of Negation in Newspaper Articles}, author={Padmaja, S and Fatima, S Sameen and Bandu, Sasidhar}, year={2014}, publisher={Citeseer}, pp. 1-6. (Year: 2014).*

Title={Splitting complex English sentences}, author={Lee, John SY and Don, J Buddhika K Pathirage}, booktitle={Proceedings of the 15th International Conference on Parsing Technologies}, 2017, pp. 50-55. (Year: 2017).*

* cited by examiner

CONTEXTUAL SPAN FRAMEWORK

BACKGROUND

The present disclosure relates to natural language processing, and more specifically, to analysis of a relatively large corpus of natural language data by a computing system. For example, the computing system may include a decision-support system to assist humans in retrieving and analyzing massive stores of data. One such example of a decision-support system is a diagnosis system employed in the healthcare industry. Diagnosis systems may be configured to utilize the abundance of unstructured knowledge that is created in many fields such as in the medical field. These diagnosis systems may be configured to structure the unstructured knowledge by, for example, tagging entities such as findings and disorders within documents of the unstructured corpus to facilitate retrieval of data of the corpus.

SUMMARY

Aspects of this disclosure relate to a system, computer program product, and method that relate to determining conceptual spans of natural language phrases. For example, the method may include receiving a phrase that includes a plurality of words in a natural language format, the plurality of words including a trigger word that modifies a meaning within the phrase of a subset of words of the plurality of words. The method may further include identifying the trigger word as modifying the meaning according to a modification principle of a predetermined set of modification principles. The method may further include identifying, by analyzing features of the phrase that link the trigger word to other words of the phrase, the subset of words using one or more rules of a span framework that indicates the subset of words. The method may further include interpreting the phrase by modifying the subset of words according to the modification principle.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
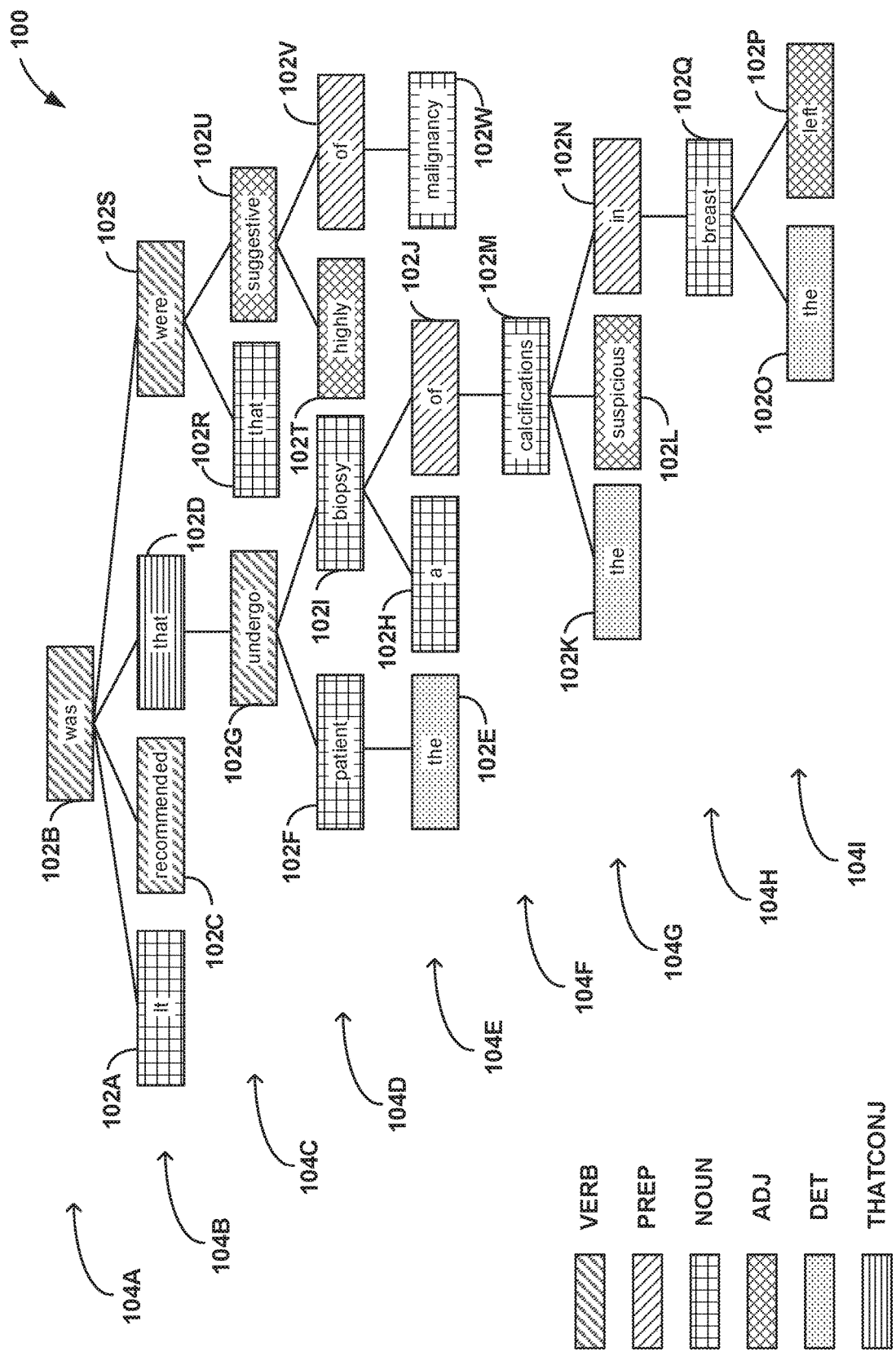
FIG. 1 depicts an example parse tree of a first example phrase that includes a hypothetical span and an uncertainty span.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing of phrases, more particular aspects relate to utilizing a span framework to identify modifying spans of phrases regardless of the type of modification. While the present disclosure is not necessarily limited to such applications, various aspects of the disclosure may be appreciated through a discussion of various examples using this context.

Aspects of this disclosure relate to receiving natural language phrases and identifying trigger words of those phrases that change a meaning of another set of words of that phrase. As used herein, the set of words whose meaning is modified by the trigger word(s) is referred to as a "span." Computing systems and methods may determine these trigger words based on relationships between words of the phrase. Further, these computing systems and methods may determine trigger words for many or substantially all types of spans, whether negation, hypothetical, suggestive, technical, or the like, using a single span framework. The computing systems and methods may identify these trigger words without the use of a definition or lemma form of the trigger word, but rather the computing system and method may use a combination of part-of-speech, slot name, polarity, or the like of the trigger words in identifying relevant spans.

Aspects of the disclosure may be configured to better identify spans over time through machine learning techniques. For example, aspects of the disclosure may "tune" the span framework algorithm(s) using dependency parser methods and functionality that is used to make parse trees as described herein. The span framework may be modified using this dependency parser functionality for spans such as like negation or hypothetical, such that the span frameworks are updated as new, e.g., negation and/or hypothetical triggers are identified.

For example, a token of a phrase as described herein may be identified as a trigger word, whether the token is a specific word or an annotation or the like. Features of the trigger word and/or relationships within the phrase between the trigger word and other tokens are identified. Algorithms may include associating these features with different spans for different phrases, therein identifying a given trigger with a specific type of span. In this way, aspects of the disclosure may identify many and/or all types of triggers, substantially regardless of the type of span (e.g., negation, hypothetical, tumor trigger spans, medical concept spans).

In certain examples, aspects of this disclosure may be configured to identify that trigger words are distinct even if they share features. For example, aspects of this disclosure may determine that the same word as used twice in a phrase relates to two different types of spans. In such examples, aspects of this disclosure may be configured to ignore the text or lemma form of the token (e.g., the definition of the word), instead identifying linking features that relate the token to other terms of the phrase. For example, aspects of the disclosure may identify a span of the framework using features such as a part of speech, slot name, polarity, or the like of the token.

Such a span identifying framework may be utilized by computing systems that are configured to receive unstructured natural language data and therein structure and analyze the natural language data. For example, such a computing system may be used to structure a corpus of (previously unstructured) natural language phrases to improve the ability of the diagnosis system in accurately interpreting natural language data. Though a diagnosis system is predominantly used herein for purposes of explanation, it is to be understood that other natural language processing (NLP) systems may be used in different examples, such as a more general question-answer system.

As used herein, a corpus as analyzed by a computing system (e.g., such as for use by a diagnosis system) may include a relatively large collection of data (e.g., tens or hundreds of terabytes of data). In some examples, most or all of the corpus may have been (e.g., when entered into the corpus) or may still include unstructured natural language data. Natural language data may be unstructured when the data includes substantially only the text and no metadata such as grammatical data, syntax data, definitional data, inter-relational data (e.g., data on relationships between words) or the like. As used herein, natural language phrases or natural language data may include sentences, phrases, notes, documents, books, or the like that were initially entered into the computing system or are otherwise stored in the computing system in their natural language format. In some examples, unstructured natural language data may initially be entered or analyzed as an image (e.g., a photocopy of hand-written notes). In other examples, unstructured natural language may initially be entered or analyzed as raw text data (e.g., entered as character data, where each letter or number or symbol or space or the like is uniquely identified).

Diagnosis systems may include systems that use such unstructured natural language data (or that convert and therein use the unstructured natural language data) to generate or otherwise critique a medical diagnosis. For example, a diagnosis system may generate or evaluate a medical diagnosis for a patient in response to the diagnosis system receiving medical data of the patient. The diagnosis system may generate or evaluate a diagnosis using a corpus of medical data that is related to a condition of the patient. In some examples, an accuracy and/or reliability of the diagnosis system may be improved by increasing an amount of data in the corpus. Additionally, or alternatively, an accuracy and/or reliability of the diagnosis system may be improved by increasing a fidelity of the data of the corpus. For example, where a diagnosis system may have an improved ability of determining an accurate linguistic meaning of data, the diagnosis system may have an increased likelihood of applying the data to generate an accurate diagnosis.

In some examples, one area in which a computing system may become more accurate is in determining trigger or trigger words as discussed above that relate to respective spans. As used herein, a trigger may be a token that alters a meaning of a subset of tokens of the phrase, the subset of tokens referred to as a span. Further, a token as used herein may be a word or an annotation or code or shorthand or the like. For example, a trigger token may be a "hypothetical" token (e.g., a token that indicates a hypothetical) such as "if" that indicates that the respective span may be a hypothetical, and therein not to be interpreted as a fact. Another example of a trigger token may include a negative determinant such as "not" that indicates that the respective span may be negated. Other types of trigger tokens (and other types of actions that the triggers cause to their respective spans) that are consistent with the disclosure are also possible.

Toward this end, in some examples a computing system may generate a parse tree data structure for phrases of the corpus. The parse tree may include each token of the phrase linked to at least one other token of the phrase in a manner the indicates relationships between the tokens. Further, the parse tree may include tokens at varying levels, where the "higher" the level of a token the more that token impacts the meaning (e.g., by defining or directing or otherwise providing syntactical context to the meaning) of other tokens of the phrase. For example, if a first token of a phrase impacts all other tokens of a phrase, that first token may be on the "highest" level of the parse tree. In such an example, a trigger token would be at a higher level than the span which the trigger token impacted, and much or all of the span might be on a single level.

The computing system may generate the parse tree using one or more logical parsing techniques. For a general outline of a logical parsing technique, a computing system may utilize a parser to generate a first parse representation of natural language content by executing NLP on the content. Once the first parse representation is generated, the system may then execute a logical parse of this first parse representation. The system may execute this logical parse by identifying latent logical operators within the first parse that are indicative of logical relationships between tokens or elements of the natural language content.

Figure 2:
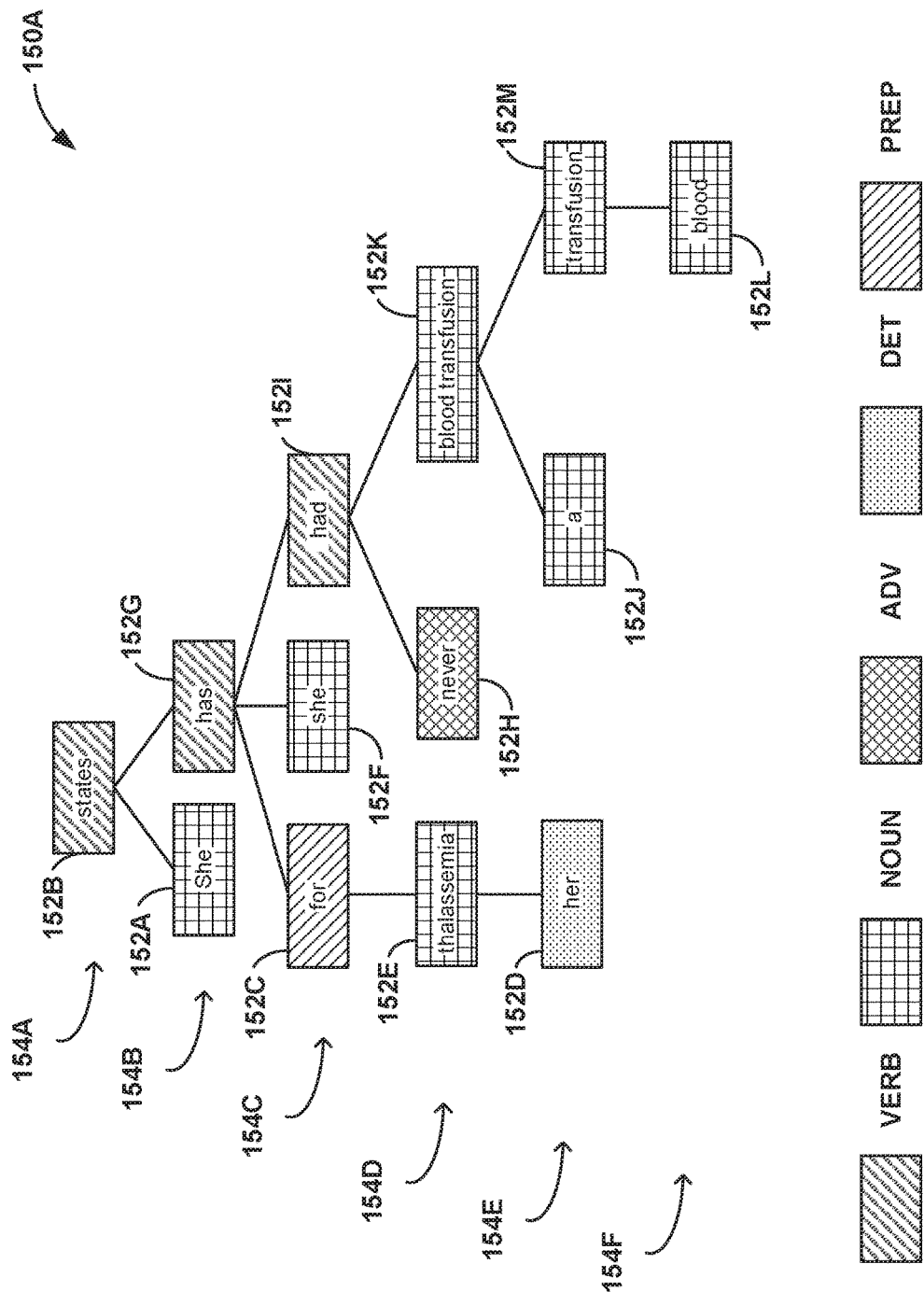
FIG. 2 depicts a first example parse tree of a second example phrase that includes a negative span.
Figure 3:
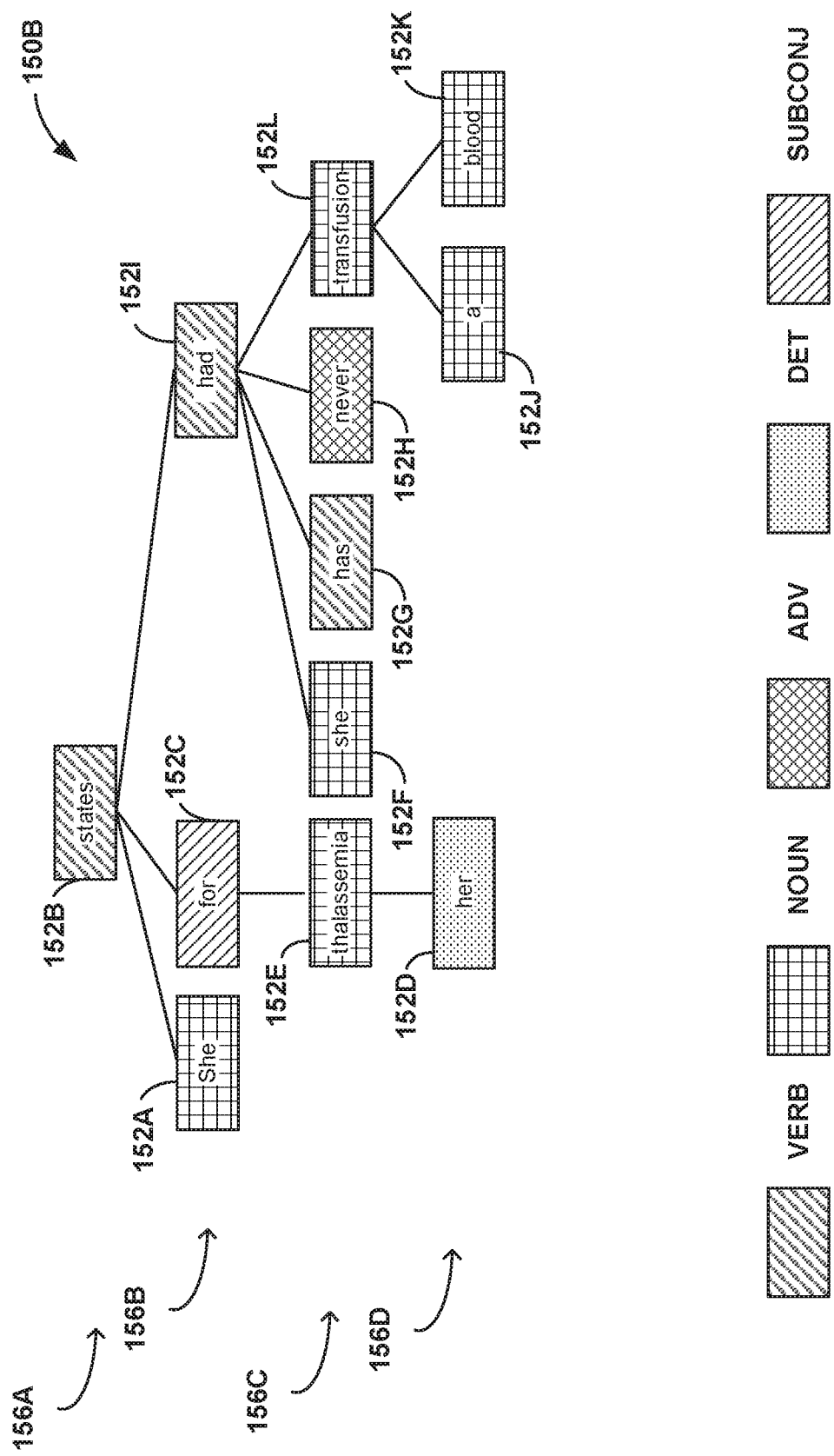
FIG. 3 depicts a second example parse tree of the second example phrase.

Logical operators may include (or may otherwise be similar to) triggers as used above. For example, logical operators may include phrases such as "not," "one of the following," "any one of," "at least one of," or logical operators may include complex logical operator terms such as "either/or" and "neither/nor," or logical operators may include relative clauses (e.g., in the sentence "It was the patient who was admitted," the clause "who was admitted" is a relative clause of the patient), or logical operators may include modifiers such as "that," "whom," or "which," or the like. The computing system may then continue by executing a reasoning operation on the logical parse to generate a knowledge output indicative of knowledge associated with one or more of the logical relationships between elements of the natural language content. In this way a computing system may generate a parse tree, other parsing techniques may be used instead of or in conjunction with such techniques. In some examples, the parse tree may be graphically created, such as created as depicted in FIGS. 1-3 of this disclosure. In such representations, the token of the phrase that is at the highest level of the phrase may be depicted as at a pinnacle of the parse tree, with tokens at lower levels being depicted as at visually lower locations. Though parsing techniques such as those that result in parse trees as depicted in this disclosure are used in this disclosure for purposes of illustration, it is contemplated that other parsing techniques or visualizations are consistent with the span frameworks described herein.

As described above, aspects of this disclosure may operate in a backend portion of the medical treatment recommendation system where NLP of medical texts is performed. In the backend system, the medical texts may be analyzed using several NLP models including one or more models implementing one or more aspects of this disclosure. In executing such analysis, medical treatment recommendation systems may utilize a span framework as described herein both with regard to machine learning and with regard to actual application to specific patients for providing specific patient medical treatment recommendations.

As a result of utilizing the span framework described herein, a system may provide a user with a more accurate answer or recommendation. For example, in conventional systems, a span of words whose meaning is modified by a trigger word may be misinterpreted. For example, a trigger word of "recommended" may have a modification principle that the words of the span may be disregarded, as an action of this span has not occurred (but rather it is recommended that it occur) and it is not certain to happen. However, in conventional systems, this trigger word may be applied to the incorrect collection of words of a phrase, such that the full phrase is misinterpreted (e.g., rather than correctly interpreting words 10-14 as recommended, the conventional system interprets words 5-8 as recommended). As such, a backend system may provide a relatively less informed or accurate answer or recommendation in response to a query from a user, as the system relied on this interpretation that improperly determined what span had a meaning modified by a modification principle.

Conversely, as described below, aspects of this disclosure are related to using a span framework that utilizes relationships and features of the words of the phrase (rather than primarily or exclusively using a definition or the like of the trigger word) to determine a span that is modified by a trigger word. As such, once properly identified, the phrase may be accurately interpreted. Once accurately interpreted, aspects of the disclosure may answer questions or provide recommendations that rely upon this phrase with accuracy and a high confidence score.

FIG. 1 depicts parse tree 100 with a plurality of tokens 102A-102W (collectively, "tokens 102") connected together and spaced across a plurality of levels 104A-104I (collectively, "levels 104"). As used herein, tokens 102 may refer to words or symbols or notations or the like. In some examples, each of tokens 102 may have a distinct and unique meaning. Further, as discussed herein, levels 104 of parse tree 100 may indicate the tokens 102 that are impacted, where a first token 102 on a first level 104 may impact the meaning of tokens 102 at a relatively lower level 104 (so long as the respective lower tokens 102 are directly connected rather than connected to the first token 102 through a second token 102 that is at least as high as or higher than the first token 102).

Parse tree 100 as depicted relates to the phrase "It was recommended that the patient undergo a biopsy of the suspicious calcifications in the left breast that were highly suggestive of malignancy." A computing system (e.g., similar to computing system 200 of FIG. 5) may generate parse tree 100. The computing system may generate parse tree 100 using NLP techniques to identify syntax and interrelationships as shown according to parsing techniques such as described herein. The specific arrangement and construction of parse tree 100 for the sentences is depicted for purposes of illustration only, as in other examples other systems may place tokens 102 on different levels 104 for different reasons.

In some examples, as depicted, parse tree 100 may be generated such that respective boxes that include tokens 102 are displayed differently (e.g., colored or shaded or otherwise styled differently) to indicate different metadata of tokens 102. For example, boxes of tokens 102 may be displayed differently to indicate what part-of-speech respective tokens 102 are. Additionally, or alternatively, boxes of tokens 102 may be displayed differently if a respective token 102 is a trigger. Other options within tokens 102 are also possible.

A computing system may identify trigger words and spans of the phrase of parse tree 200 utilizing a span identifying framework. The computing system may identify "recommended" token 102C of the phrase as an "ignore" trigger word, being as the span for this trigger word (e.g., the thing which is recommended) did not actually happen and is not certain to happen. Further, the computing system may identify "suggestive" token 102U as an "uncertainty" trigger word, being as the span for this trigger word is not certain to currently be true.

Once trigger words are identified, the computing system may utilize the span framework to identify spans of the trigger words. The span framework may include a rule that identifies spans as including tokens 102 that are on lower levels 104 than a conjunction that is associated with the trigger while still directly connected to the conjunction (e.g., where such a rule is referred to as a sibling rule, where the conjunction is a sibling to the trigger word). Put differently, the span framework may include identifying a span as including one or more specific branch of parse tree 100 that links from a conjunction (e.g., such as "that") that is relating to the trigger word.

In this example, a computing system may identify "that" token 102D which is associated to trigger word "recommended" token 102C (e.g., as "that" indicates what is "recommended"), as a result of token 102D having a slot name "thatconj" (e.g., being a conjunction.) Upon identifying such features of "recommended" token 102C, a computing system may identify tokens 102 that are linked to the trigger word "recommended," therein using the span framework (and the sibling rule described above) that the trigger word "recommended" is related to tokens 102E-102M as a result of these tokens 102E-102M branching down from related "that" token 102D. Such framework may be generated over time through iteration and correction. For example, after other corrections from an administrative user associating words branching from a "that" conjunction, a computing system may identify the sibling rule. For another example, a computing system may use other NLP techniques to determine a span that is related to the trigger word to generate new rules for the framework.

In addition to more complex rules such as a sibling rule as described above, the span framework may include rules where a span is the branch that sprouts from a trigger word. For example, a second part of the span framework may include identifying that trigger word "suggestive" token 102U, and that "highly" token 102T has an "adjective" slot name and is related to the trigger word "suggestive" token 102U, such that the span includes tokens 102V, 102W.

In this way, aspects of the disclosure may be related to using a span framework to identify a span of words whose meaning is modified by a trigger word, therein accurately modifying the meaning of that trigger word by a modification principle of the trigger word. For example, if the trigger word is "suggested," the modification principle may include ignoring the words of the span. As such, for a phrase "it was suggested that the patient seriously consider going to a lab today to verify that the tests come back negative," even though words of the span are affirmative on their own (e.g., "verify that the tests come back negative"), when properly modified by the modification principle it is clear that the tests have not come back negative.

For another example, a phrase may include two trigger words, one that is negation and one that is a polarity changing trigger word. Such a phrase may include something along the lines of, "no malignancy was discovered in the samples of the liver that were tested and, though stomach samples tested positive, follow up tests to verify were schedule," where "no" is a trigger word that negates the meaning of "malignancy was discovered in the samples of the liver" and "though" is a trigger word that effectively changes the polarity of the sentence (from negation to affirmation. As such, aspects of the span framework may be used to identify that a span "malignancy was discovered in the samples of the liver" is modified with a negation modification principle (e.g., such that these words are interpreted as false, rather than true), while a span "stomach samples tested positive" is modified with an alternate polarity to have an affirming modification principle (e.g., such that the positive stomach samples is properly identified as being true, not false). Aspects of the disclosure may be better than conventional systems at interpreting phrases such as these that are more awkwardly phrased, with polarity-switching trigger words bisecting what might otherwise be considered to be a single span. Put differently, a conventional system may inaccurately interpret the phrase above to include a span to be "malignancy was discovered in the samples of the liver that were tested and [ ] stomach samples tested positive" that is all modified by a "negation" modification principle, therein inaccurately interpreting the second half of the phrase. As such, aspects of this disclosure may increase an ability of a computing system to accurately interpret a span of a phrase, therein increasing an ability of that computing system to respond to questions or queries or prompts related to that phrase.

In some examples, different parsing techniques may result in a phrase being parsed into different parse trees. As such, the span framework may be configured to identify spans for a phrase for many or all different parse trees into which the phrase may be parsed. For example, FIG. 2 depict parse tree 150A and FIG. 3 depicts parse tree 150B, both of which are similar to parse tree 100 of FIG. 1 and both of which are parsing a single phrase. Parse tree 150A, 150B (collectively, "parse trees 150") includes tokens 152A-152M (collectively, "tokens 152"), where parse tree 150A includes tokens 152A-152M and parse tree 150B includes tokens 152A-152J, 152L, 152M. These tokens 152 are connected together and spaced across a plurality of levels 154A-154F (collectively, "levels 154") in parse tree 150A and levels 156A-156D (collectively, "levels 156") in parse tree 150B. Tokens 152 may be substantially similar to tokens 102, and levels 154, 156 may be substantially similar to levels 104, with the exception of any differences described herein.

Both parse trees 150 as depicted relate to the phrase "She states for her thalassemia she has never had a blood transfusion." A computing system (e.g., similar to computing system 200 of FIG. 5) may generate one or both of parse tree 150s. The computing system may generate parse trees 150 using NLP techniques to identify syntax and interrelationships as shown. The specific arrangement and construction of both parse trees 150 is depicted for purposes of illustration only, as in other examples other systems may place tokens 152 on different levels 154, 156 for different reasons. Aspects of this disclosure may identify a trigger word "never" token 152H. This trigger word may be related to a modification principle of "negation," such that tokens or words to which this trigger word relates are modified to be negated (e.g., these words are interpreted as being not true). However, given the different parsing techniques that lead to different parsing trees 150, a computing system may utilize different rules of span framework to identify the span of the phrase.

For example, in FIG. 2, parse tree 150A includes trigger word "never" token 152H as directly connected to a parent "had" token 152I, which in parse tree 150A is identified as a verb part of speech. Further, it may be identified that the parent "had" token 152I may have only two children branches, one of them only including the trigger word token 152H. Upon identifying that the trigger word is linked to a parent token 152I that is a verb and that parent token 152I only has two child branches, span framework may identify the "other" child branch of this parent token 152I as the span of the trigger word "never" token 152H. For example, span framework may include a parent verb rule that identifies that a parent verb of a trigger word identifies the span as the other child branch of the parent verb, in this case "a blood transfusion" tokens 152J-152M.

Alternatively, in FIG. 3, parse tree 150B, one of the differences between parse tree 150B and parse tree 150A may include that "had" parent token 152I may have three child branches in addition to trigger word "never" token 152H. In this example, span framework may utilize a rule of span framework that includes identifying a branch that was after "had" parent token 152I in the original phrase, identifying branch that includes tokens 152J-152L. As such, a computing system interpreting the phrase may use the modification principle of the trigger word "never" token 152 to interpret tokens 152J-152L.

Figure 4:
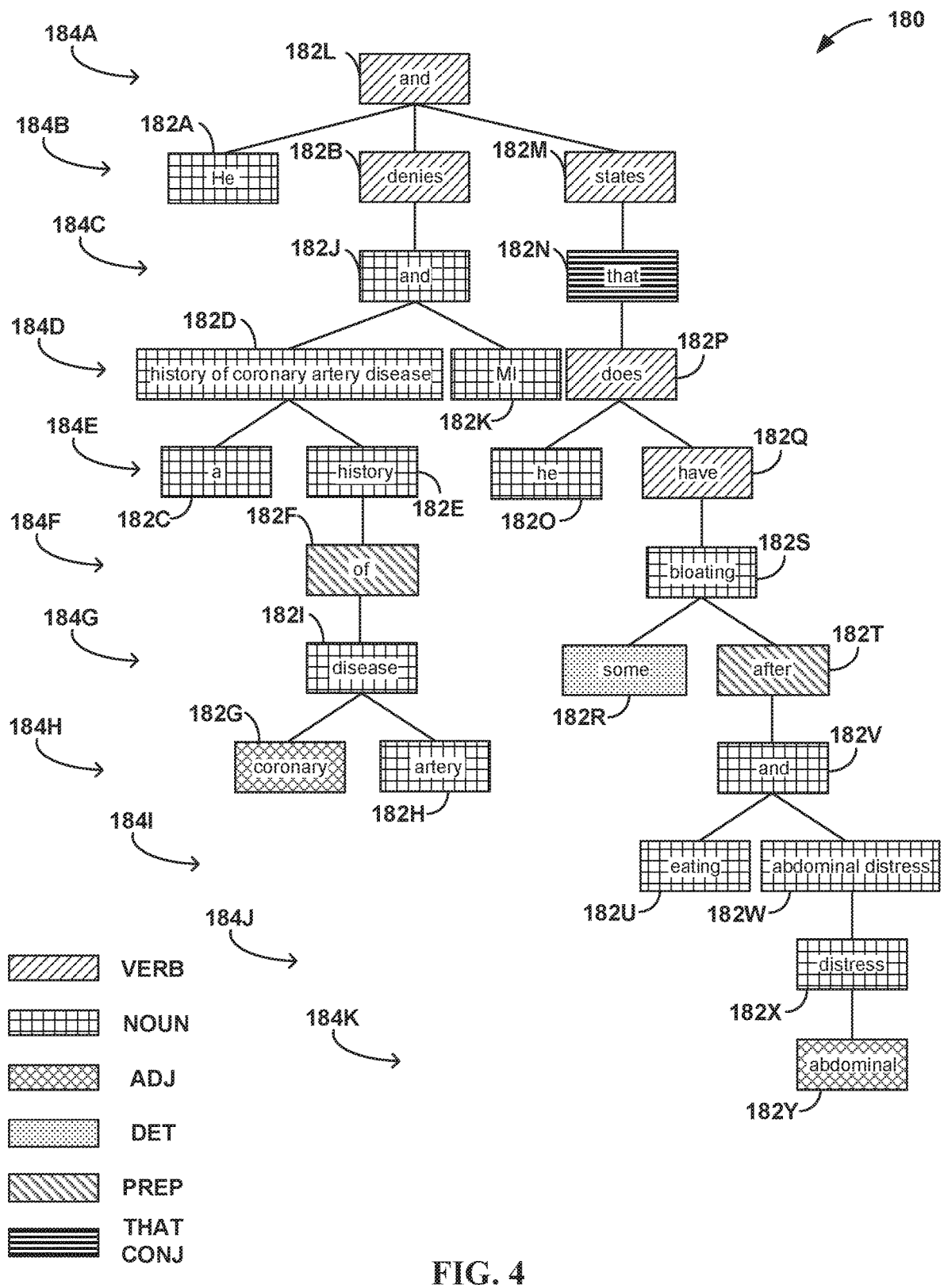
FIG. 4 depicts an example parse tree of a third example phrase that includes a negative span and an affirmative span.

For another example, FIG. 4 depicts parse tree 180 similar to parse trees 100, 150A, 150B of FIGS. 1, 2, and 3. Parse tree 180 includes tokens 182A-182Y (collectively, "tokens 182") connected together and spaced across a plurality of levels 184A-184K (collectively, "levels 184"). Tokens 182 may be substantially similar to tokens 102, 152, and levels 184 may be substantially similar to levels 104, 154, 156 with the exception of any differences described herein. Parse tree 180 as depicted relates to the phrase "He denies a history of coronary artery disease and MI and states that he does have some bloating after eating and abdominal distress." A computing system (e.g., similar to computing system 200 of FIG. 5) may generate parse tree 180. The computing system may generate parse tree 180 using NLP techniques to identify syntax and interrelationships as shown. The specific arrangement and construction of parse tree 180 is depicted for purposes of illustration only, as in other examples other systems may place tokens 182 on different levels 184 for different reasons.

A computing system may identify trigger word "denies" token 182B as relating to a modification principle of "negation," as discussed herein. Further, a computing system may identify "states that" tokens 182M, 182N and/or "does have" tokens 182P, 182Q as trigger words that relate to a modification principle of "changing polarity." Polarity may relate to an ongoing modification principle of the phrase (e.g., in this case, a negation principle) that may be switched to an opposing or opposite modification principle (e.g., in this case, switching to be an affirmative principle). As such, a computing system may determine that words that come after these tokens 182M, 182N, 182P, 182Q within the phrase have an opposite polarity to some or all tokens 182 that proceeded these tokens 182M, 182N, 182P, 182Q.

As such, rules of the span framework include identifying a child branch of trigger word "denies" token 182B that includes tokens 182C-182K is part of the span that is modified by the negation principle of trigger word "denies" token 182B. Further, a follow up rule of the span framework may include identifying that a sibling branch of the trigger word token has an opposing polarity, such that the tokens 182M-182Y are not part of the span. Using techniques such as these, a computing system may determine spans of identified trigger words, regardless of the trigger word and regardless of the structure of the phrase as parsed by the computing system.

Figure 5:
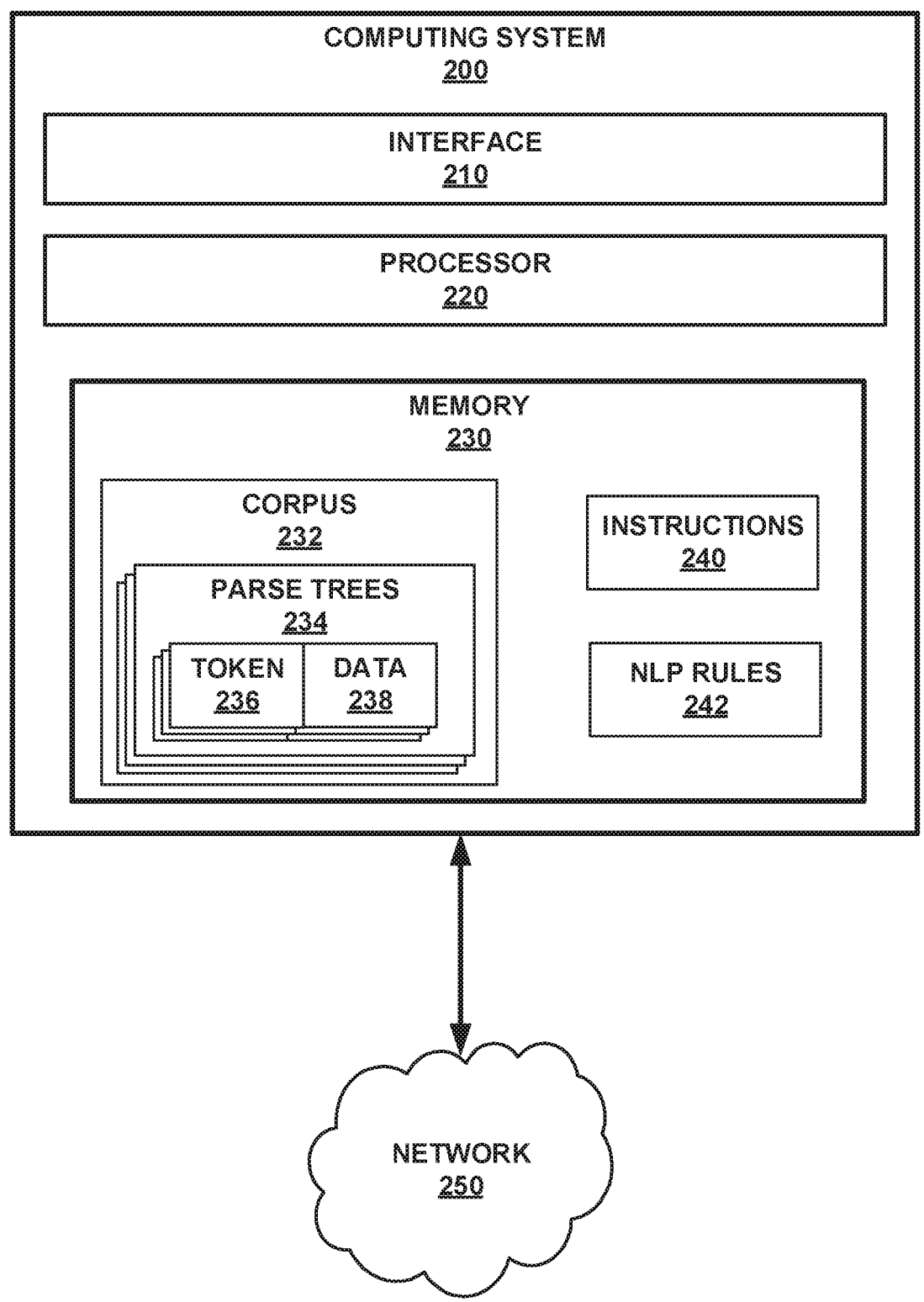
FIG. 5 depicts an example computing system for utilizing a span identifying framework to analyze a natural language phrase.

As described above, a computing system may generate parse trees 100, 150, 180 and identify spans using the span framework as described herein to therein better organize and structure a corpus. For example, FIG. 5 is a conceptual box diagram of such a computing system 200. While computing system 200 is depicted as a single entity (e.g., within a single housing) for the purposes of illustration, in other example computing system 200 may include two or more discrete physical systems (e.g., within two or more discrete housings). Computing system 200 may include interfaces 210, processor 220, and memory 230. Computing system 200 may include any number or amount of interface 210, processor 220, and/or memory 230.

Computing system 200 may include components that enable computing system 200 to communicate with (e.g., send data to and receive and utilize data transmitted by) devices that are external to computing system 200. For example, computing system 200 may include interface 210 that is configured to enable computing system 200 and components within computing system 200 (e.g., such as processor 220) to communicate with entities external to computing system 200. Specifically, interface 210 may be configured to enable components of computing system 200 to communicate with external databases or other computers uploading new phrases or the like. Interface 210 may include one or more network interface cards, such as Ethernet cards, and/or any other types of interface devices that can send and receive information. Any suitable number of interfaces may be used to perform the described functions according to particular needs.

Computing device 200 may use interface 210 to communicate with other devices over network 250. Network 250 may include one or more private or public computing networks. For example, network 250 may comprise a private network (e.g., a network with a firewall that blocks non-authorized external access). Alternatively, or additionally, network 250 may comprise a public network, such as the Internet. Although illustrated in FIG. 1 as a single entity, in other examples network 250 may comprise a combination of public and/or private networks. For example, computing device 200 may communicate with a database that includes a corpus of unstructured data via a first portion of network 250 that is private (e.g., such that both computing device 200 and the database are secured within one or more firewalls) while computing device 200 communicates with a second computer that is uploading a new set of unstructured data via a second portion of network 250 that is public (e.g., the Internet).

As discussed herein, computing system 200 may be configured to generate parse trees and identify spans that are modified by triggers using a span framework such as described above. Computing system 200 may utilize processor 220 to thusly utilize this span framework. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to identify spans using a span framework.

Processor 220 may identify spans of a phrase using the span framework according to instructions 240 stored on memory 230 of computing system 200. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 220 may identify spans using the span framework according to instructions 240 of one or more applications (e.g., software applications) stored in memory 230 of computing system 200.

In addition to instructions 240, in some examples unstructured data of corpus 232 as described herein or NLP rules 242 for better learning how to identify rules for span framework or the like as used by processor 220 to analyze natural language phrases may be stored within memory 230. For example, memory 230 may include corpus 232. As discussed herein, corpus 232 may include a plurality of natural language phrases that were previously unstructured. Within corpus 232, as depicted, phrases may be stored within respective parse trees 234. Each parse tree 234 may include a plurality of tokens 236 with a plurality of data 238. Data 238 may include polarity, slot name, part of speech, or other types of data as described above. As depicted, tokens 236 and data 238 may be related, e.g., combined together into single entry of a parse tree 234.

Other types of data may also be stored within memory 230 for use by processor 220 in utilizing a span identifying framework. For example, memory 230 may include natural language processing (NLP) rules 242 with which computing system 200 may store NLP techniques that it utilizes and updates and reinforces or disregards through machine learning (ML) techniques. In some examples, processor 220 may execute instructions 240 such that modifications or updates or deletions of data 238 of parse trees 234 from a skilled operator (e.g., a doctor or a NLP trainer of computing system 200) may cause NLP rules 242 and/or rules of a span framework as saved in instructions 240 to themselves be updated or modified or deleted to reflect such skilled corrections. In some examples, a person may view some or all of NLP rules 242 to reinforce or disregard (e.g., delete or otherwise modify) some rules stored within memory 230.

Figure 6:
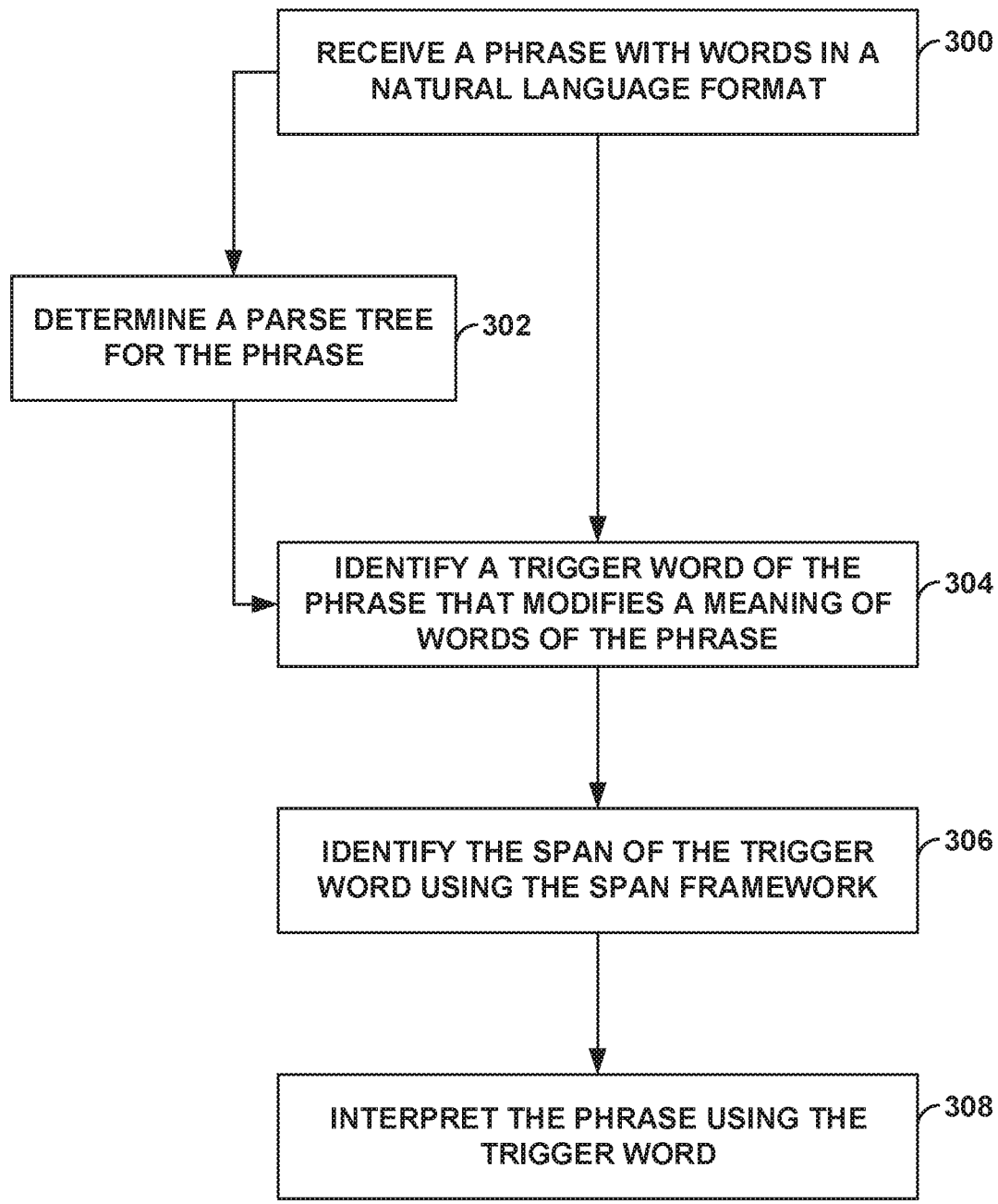
FIG. 6 depicts a flowchart of an example method of utilizing a span identifying framework to identify one or more spans of a natural language phrase.

Using these components, computing system 200 may identify spans using span frameworks as discussed herein. For example, computing system 200 may identify spans using a span framework according to the flowchart depicted in FIG. 6. The flowchart of FIG. 6 is discussed with relation to FIG. 5 for purposes of illustration, though it is to be understood that other systems may be used to execute the flowchart of FIG. 6 in other examples. Further, in some examples computing system 200 may execute a different method than the flowchart of FIG. 6, or computing system 200 may execute a similar method with more or less steps in a different order, or the like.

Computing system 200 may receive a phrase that includes a plurality of tokens in a natural language format (300). Computing system 200 may receive the phrase in an unstructured format. For example, computing system 200 may have electronic text or a graphical image of text uploaded (e.g., uploaded over network 250 using interface 210).

In some examples, computing system 200 may generate a parse tree data structure for the phrase (302). Computing system 200 may generate a parse tree similar to parse tree 100 of FIG. 1, parse tree 150A of FIG. 2, parse tree 150B of FIG. 3, parse tree 180 of FIG. 4, or the like. Computing system 200 may generate the parse tree such that the parse tree includes a plurality of levels relating to dependencies within the phrase. In some examples, computing system 200 may generate the parse tree data structure to leverage an infrastructure that is configured to identify tokens and dependencies within the phrase. In other embodiments, the computing system 200 does not generate a parse tree. Computing system 200 may identify a trigger word of the phrase (304). In some examples, computing system 200 may identify a plurality of trigger words of the phrase. Computing system 200 may utilize NLP techniques as described herein to identify the trigger word of the phrase. Identifying the trigger word may include identifying a modification principle of the trigger word.

Computing system 200 may identify a span whose meaning is modified by the trigger word using the span framework (306). For example, using the span framework, computing system 200 may determine which branches of the respective parse tree to go down, whether to look to a parent token, a sibling branch, look to only some children tokens or all children tokens, or the like. The span framework may include a plurality of rules that dictate where on the parse tree the span is located. As described herein, the rules may relate to slot names, parts of speech, polarities, or the like as related to the trigger word.

Computing system 200 may enable privileged users to modify the span framework. For example, rules of the framework may be added, deleted, or modified by users in such a way that it will be updated moving forward. In some examples, a user may initially highlight some features of words and therein select spans in a training mode for computing system 200, in response to which computing system 200 may organically learn one or more rules of framework. Further, in some examples computing system 200 may detect when certain users do not update rules, therein strengthening a usage or correlation between a rule and the features of the phrase that resulting in computing system 200 utilizing that rule.

In some examples, utilizing a span framework may start with identifying the smallest sub-parse that contains the entire trigger. For example, where the trigger includes multiple words, the sub-parse may include all of the multiple words. Further, computing system 200 may identify one or more relevant parent tokens of the trigger word. The top token of the sub parse (e.g., the token on the highest level of the sub parse) may be analyzed. Put differently, one or more parent tokens of the trigger word may be analyzed and used for a determination of the span. For example, a slot name, part of speech, and any potential polarity of the top token. From this, the span framework may include selecting one or more branches of the parse tree to comprise the span.

In some examples, the span framework may include identifying a changing polarity of the phrase that impacts the meaning of the trigger word. For example, the span framework may be configured to identify such potential polarity flipping triggers such as "except for," "alternatively," "however," "not including," or the like. Computing system 200 may utilize such stop triggers in identifying what tokens and/or branches are and aren't part of the span. In some examples, span framework may initially include first gathering in a "super span" that includes all words whose meaning may be modified by the trigger word, and afterword removing any portion of this super span that is determined to have an opposed polarity as described herein.

In some examples, the initial set of rules (and/or the final set of rules) may be stored in an associative array type data structure, such as a hash table or hash map. The data structure may include, e.g., part of speech and slot name as an ordered pair. Computing system 200 may consult this data structure for rules relating navigating to parent tokens, sibling branches, or the like in identifying the span. For example, the ordered pair may indicate whether or not parent tokens, sibling tokens, child tokens, or the like are included in the span based on whether or not one of the tokens have predetermined features, such as a predetermined slot name or part of speech or the like. Each ordered pair may function as an if-then type rule, identifying one or features of one or more tokens to be satisfied for the span to include a predetermined branch or token. For example, the ordered pair may indicate that a predetermined sibling branch is to be part of the span if the parent token of both the trigger and the sibling branch has a predetermined slot name. For another example, the ordered pair may indicate that a predetermined sibling is not part of the span if the sibling token includes a different polarity than the trigger word.

For a specific example of what the ordered pair rule may include, in analyzing parse tree 150A of FIG. 2, computing device 200 may reference a rule that includes:
HashMap order pair get(("adv_vadv",SIBLING_ADV_VADV)
where
List<String> SIBLING_ADV_VADV=new ArrayList <String>( ){{add("noun_subj"); add("subconj_vsubconj"); }};

This rule may show that, where trigger word "never" token 152H includes "adverb" features, sibling branches that include nouns are to be part of the span. As described herein, the span framework may include a plurality of rules such as this, such that computing device 200 may analyze all of them to determine the span of the phrase.

Once the span is identified, computing device 200 may interpret the phrase using the trigger word (308). Interpreting the phrase using the trigger word may include applying the modification principle of the trigger word to the words of the phrase. Computing device 200 may interpret the phrase in providing the functionality described herein, such as in a medical diagnosis system or other question-answering system or the like. Once interpreted, computing device 200 may integrate the now-structured phrase into corpus 232 with other previously unstructured natural language data.

As a result of a properly interpreted phrase, computing device 200 may have an improved ability to receive and respond to a prompt or query or question regarding the phrase. For example, computing device 200 may answer a question about a patient of the phrase accurately, or patient may use the phrase as a single data point in providing a diagnosis, or the like. Once the response to the query is determined, computing device 200 may provide this response to the user.

The examples described above provides mechanisms for ingesting electronic texts, documents, or other portions of textual content and analyzing the textual content to distinguish portions of the text directed to hypotheticals from portions of text directed to actual facts or events that actually occurred. However, though examples described above predominantly relate to medical texts and a cognitive medical treatment diagnosis system, one of ordinary skill in the art would appreciate that aspects of this disclosure may be implemented with regard to many types of text of various domains without departing from the spirit and scope of the present disclosure. Thus, for example, the mechanisms described herein may be implemented with regard to judicial text or any other type of text which may include hypothetical portions and factual portions that may utilize the span identifying framework discussed herein to identify spans of natural language phrases to execute an analytical, cognitive, or other processing of text to generate a result.

In the context of a medical treatment recommendation system embodiment in which the mechanisms of the illustrative embodiments distinguish factual portions of text from hypothetical portions of text, the mechanisms of the illustrative embodiments may ingest various types of medical texts and apply the mechanisms of the illustrative embodiments to these medical texts. These medical texts may include, for example, patient electronic medical records (EMRs) in which medical service providers, e.g., doctors, nurses, hospitals, medical laboratories, pharmacies, medical insurance companies, and the like, may contribute content for inclusion in the EMR. As such, the medical text from each of these sources may contain both facts (actual occurrences, events, or results) and hypotheticals, i.e. plans or other possibilities that did not in actuality occur.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving a first and second phrase that includes a respective first and second plurality of words that are both in a natural language format, the first and second plurality of words including a respective first and second trigger word that modifies a respective first and second meaning within the respective phrase of a respective first and second subset of words of the respective first and second plurality of words;
    identifying the first trigger word as modifying the first meaning according to a negation modification principle of a predetermined set of modification principles;
    identifying the second trigger word as modifying the second meaning according to an uncertainty modification principle of the predetermined set of modification principles;
    identifying, by analyzing features of the first phrase such as part of speech and slot name that link the first trigger word to other words of the first phrase, the first subset of words using one or more rules of a span framework that indicates the subset of words, wherein the rules of the span framework do not include analyzing a definition or lemma form of the trigger word and are agnostic as to which of the modification principle is applicable but instead only analyze structural elements of an applicable phrase, such that each of the rules of the span framework differs from each other only by analyzing different structural elements such as part of speech and slot name rather than modification principle;
    identifying, by analyzing features of the second phrase such as part of speech and slot name that link the second trigger word to other words of the second phrase, the second subset of words using the one or more rules of the span framework, such that an exact same set of rules is used to identify both the second subset of words and the first subset of words;
    interpreting the first phrase by modifying the first subset of words according to the negation modification principle; and
    interpreting the second phrase by modifying the second subset of words according to the uncertainty modification principle.

2. The computer-implemented method of claim 1, wherein features of the first phrase include a polarity within the first phrase.

3. The computer-implemented method of claim 1, wherein features of the first phrase include features of a parent word of the first trigger word.

4. The computer-implemented method of claim 1, wherein the predetermined set of modification principles include a hypothetical modification principle.

5. The computer-implemented method of claim 1, further comprising:
    receiving a query from a user relating to the first phrase;
    providing, to the user, a response to the query using data of the first phrase by interpreting the first phrase by modifying the first subset of words according to the negation first modification principle.

6. The computer-implemented method of claim 1, wherein the first trigger word is the same word as the second trigger word.

7. A system comprising:
    a processor; and
    a memory in communication with the processor, the memory containing program instructions that, when executed by the processor, are configured to cause the processor to:
        receive a first and second phrase that includes a respective first and second plurality of words that are both in a natural language format, the first and second plurality of words including a respective first and second trigger word that modifies a respective first and second meaning within the respective phrase of a respective first and second subset of words of the respective first and second plurality of words;
        identify the first trigger word as modifying the first meaning according to a negation modification principle of a predetermined set of modification principles;
        identify the second trigger word as modifying the second meaning according to an uncertainty modification principle of the predetermined set of modification principles;
        identify, by analyzing features of the first phrase such as part of speech and slot name that link the first trigger word to other words of the first phrase, the first subset of words using one or more rules of a span framework that indicates the subset of words, wherein the rules of the span framework do not include analyzing a definition or lemma form of the trigger word and are agnostic as to which of the modification principle is applicable but instead only analyze structural elements of an applicable phrase, such that each of the rules of the span framework differs from each other only by analyzing different structural elements such as part of speech and slot name rather than modification principle;
        identify, by analyzing features of the second phrase such as part of speech and slot name that link the second trigger word to other words of the second phrase, the second subset of words using the one or more rules of the span framework, such that an exact same set of rules is used to identify both the second subset of words and the first subset of words;

interpret the first phrase by modifying the first subset of words according to the negation modification principle; and interpret the second phrase by modifying the second subset of words according to the uncertainty modification principle.

8. The system of claim 7, wherein features of the phrase include a polarity of a parent word of the trigger word.

9. The system of claim 7, wherein the first trigger word is the same word as the second trigger word.

10. A computer program product, the computer program product comprising a computer readable storage medium having program instructions embodied therewith, the program instructions executable by a computer to cause the computer to:

receive a first and second phrase that includes a respective first and second plurality of words that are both in a natural language format, the first and second plurality of words including a respective first and second trigger word that modifies a respective first and second meaning within the respective first and second phrase of a subset of words of the respective first and second plurality of words;

identify the first trigger word as modifying the first meaning according to a negation modification principle of a predetermined set of modification principles;

identify the second trigger word as modifying the second meaning according to an uncertainty modification principle of the predetermined set of modification principles;

identify, by analyzing features of the first phrase such as part of speech and slot name that link the first trigger word to other words of the first phrase, the first subset of words using one or more rules of a span framework that indicates the subset of words, wherein the rules of the span framework do not include analyzing a definition or lemma form of the trigger word and are agnostic as to which of the modification principle is applicable but instead only analyze structural elements of an applicable phrase, such that each of the rules of the span framework differs from each other only by analyzing different structural elements such as part of speech and slot name rather than modification principle;

identify, by analyzing features of the second phrase such as part of speech and slot name that link the second trigger word to other words of the second phrase, the second subset of words using the one or more rules of the span framework, such that an exact same set of rules is used to identify both the second subset of words and the first subset of words;

interpret the first phrase by modifying the first subset of words according to the negation modification principle; and interpret the second phrase by modifying the second subset of words according to the uncertainty modification principle.

11. The computer program product of claim 10, wherein features of the phrase include a polarity of a parent word of the trigger word.

12. The computer program product of claim 10, wherein the predetermined set of modification principles include a hypothetical modification principle.

13. The computer program product of claim 10, wherein the first trigger word is the same word as the second trigger word.

* * * * *